(12) United States Patent
Yamada et al.

(10) Patent No.: US 6,283,559 B1
(45) Date of Patent: Sep. 4, 2001

(54) NEGATIVE PRESSURE CONTROL APPARATUS FOR BRAKE BOOSTER (75) Inventors: Yoshihisa Yamada; Hiroaki Endo, both of Shizuoka-ken; Ryochi Watanabe, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/295,355

(22) Filed: Apr. 21, 1999

(30) Foreign Application Priority Data

Jun. 2, 1998 (JP) .................................. 10-153253

(51) Int. Cl.⁷ ...................................................... B60T 8/34
(52) U.S. Cl. ............................................................. 303/113.3
(58) Field of Search ................................. 303/113.3, 144, 303/24.1, 192, 191, 193

(56) References Cited

U.S. PATENT DOCUMENTS

| 3,754,841 | | 8/1973 | Grabb et al. . | |
|---|---|---|---|---|
| 3,799,303 | | 3/1974 | Stoltman . | |
| 3,947,073 | | 3/1976 | Cattaneo et al. . | |
| 5,408,411 | * | 4/1995 | Nakamura et al. | 364/424.01 |
| 5,564,796 | * | 10/1996 | Saito et al. | 303/112 |
| 5,826,559 | | 10/1998 | Ichimoto et al. . | |
| 5,846,164 | | 12/1998 | Harada . | |
| 5,915,357 | * | 6/1999 | Harada et al. | 123/399 |
| 5,950,594 | | 9/1999 | Mizuno . | |
| 5,950,595 | | 9/1999 | Yoshioka et al. . | |
| 5,984,435 | * | 11/1999 | Tsukamoto et al. | 303/191 |
| 6,006,716 | * | 12/1999 | Harada et al. | 123/295 |
| 6,009,368 | * | 12/1999 | Labuhn et al. | 701/96 |
| 6,017,100 | | 1/2000 | Mizuno et al. . | |
| 6,044,321 | * | 3/2000 | Nakamura et al. | 701/96 |
| 6,044,831 | * | 4/2000 | Takagi et al. | 123/698 |
| 6,095,116 | * | 8/2000 | Matsushita et al. | 123/350 |

FOREIGN PATENT DOCUMENTS

| 25 05 880 A1 | 8/1976 | (DE) . |
|---|---|---|
| 28 14 384 A1 | 10/1979 | (DE) . |
| 32 38 882 A1 | 4/1984 | (DE) . |
| 36 30 987 A1 | 3/1988 | (DE) . |
| A-5-208665 | 8/1993 | (JP) . |
| A-8-208663 | 8/1993 | (JP) . |
| A-7-247866 | 9/1995 | (JP) . |
| A-8-164840 | 6/1996 | (JP) . |
| A-8-318764 | 12/1996 | (JP) . |

* cited by examiner

Primary Examiner—Robert J. Oberleitner
Assistant Examiner—Xuan Lan Nguyen
(74) Attorney, Agent, or Firm—Oliff & Berridge PLC (57) ABSTRACT A negative pressure control apparatus for a brake booster is provided which can always maintain a required negative pressure in a negative pressure chamber of the brake booster in a system including a direct-injection engine. The apparatus has a brake operation predicting part for predicting execution of a brake operation by a driver. When execution of a brake operation is predicted, negative pressure in the negative pressure chamber is controlled to be a required value.

11 Claims, 4 Drawing Sheets

NEGATIVE PRESSURE CONTROL APPARATUS FOR BRAKE BOOSTER

BACKGROUND OF THE INVENTION

1. Field of the Invention

The present invention relates to a negative pressure control apparatus for a brake booster, and particularly to a negative pressure control apparatus for controlling negative pressure of a brake booster which assists a brake operation by using intake manifold negative pressure of a direct-injection engine as a power source.

2. Description of the Related Art

Conventionally, as disclosed in Japanese Laid-Open Patent Application No. 5-208663, a braking apparatus having a brake booster is known. The brake booster is a mechanism which assists a brake operation by using an intake manifold negative pressure as a power source so that a larger braking force can be generated.

Generally, in a case of a regular engine which controls an opening of a throttle valve in accordance with an acceleration operation, when a driver intends to decelerate a vehicle, that is, when an accelerator pedal is not depressed, the throttle valve is closed so that a relatively large intake manifold negative pressure is generated. Thus, when the driver performs a brake operation, the brake booster can be positively operated.

The above-mentioned conventional braking apparatus has a function of performing an automatic brake control for generating a braking force irrespective of whether or not a brake operation is performed when an obstacle is detected ahead of the vehicle. In the above-mentioned conventional braking apparatus, the brake booster is constructed so that it can generate a required braking force when no brake operation is performed. However, if the automatic brake control is performed when the driver intends to accelerate the vehicle, that is, when the throttle valve is opened, the intake manifold negative pressure is decreased. In this case, the negative pressure in the brake booster may become insufficient and the brake booster in the automatic brake control may not generate the required braking force. In order to avoid such a problem, the above conventional braking apparatus generates an intake manifold negative pressure which is sufficient for performing the automatic brake control by forcibly closing the throttle valve when an establishment of a condition for starting the automatic brake control is predicted.

Conventionally, a direct-injection engine is known which has a fuel injector disposed inside a combustion chamber and directly injects fuel in the combustion chamber. According to the direct-injection engine, fuel economy can be improved by fully opening a throttle valve so that a pumping loss of the engine is reduced when, for example, the engine is operating under a low load. Thus, in the direct-injection engine, the intake manifold negative pressure may be decreased by the throttle valve being fully opened when an acceleration operation is not being performed. Consequently, in a vehicle having the direct-injection engine, the negative pressure in the brake booster may become insufficient when the driver intends to decelerate the vehicle.

However, the above-mentioned conventional braking apparatus is adapted to be applied to the regular engine in which a sufficient intake manifold negative pressure is generated by the throttle valve being closed when a vehicle is decelerated. Therefore, if the above-mentioned conventional braking apparatus is applied to the direct-injection engine, it is possible that a sufficient braking force cannot be generated due to insufficient negative pressure in the brake booster when the driver performs a brake operation.

SUMMARY OF THE INVENTION

It is an object of the present invention to provide a negative pressure control apparatus for a brake booster which can always maintain a required negative pressure in the brake booster in a system which includes a direct-injection engine.

The above object of the present invention can be achieved by a negative pressure control apparatus for a brake booster for controlling negative pressure in a negative pressure chamber of the brake booster which can be connected to an intake pipe of an engine at a position downstream of a throttle valve, the apparatus comprising:

a brake operation predicting part for predicting execution of a brake operation by a driver; and a booster negative pressure controller for controlling the negative pressure in the negative pressure chamber to be a required value when execution of a brake operation is predicted.

In this invention, negative pressure in the negative pressure chamber of the brake booster is controlled to be a required value when execution of a brake operation is predicted. Thus, it is possible to maintain a sufficient negative pressure in the negative pressure chamber of the brake booster for assisting a brake operation in a system which includes a direct-injection engine. Therefore, according to the invention, a sufficient braking force can always be generated when a brake operation is performed.

In this case, when a vehicle is running on a downhill road, it can be judged that a driver is likely to perform a brake operation so as to suppress an increase in a vehicle speed. Thus, the brake operation predicting part may predict execution of a brake operation when a vehicle is running on a downhill road.

Additionally, when a vehicle behavior control such as a vehicle stability control (VSC) or a traction control (TRC) for controlling a behavior of a vehicle is being performed, it can be judged that a driver is likely to perform a brake operation so as to decelerate the vehicle. Thus, the brake operation predicting part may predict execution of a brake operation when the vehicle behavior control is being performed.

Additionally, when a between-car time to a car running ahead (that is, a value obtained by dividing a distance to a vehicle running ahead by an approaching speed relative to that car) is small, it can be judged that the driver is likely to perform a brake operation so as to avoid a contact with the car running ahead. Thus, the brake operation predicting part may predict execution of a brake operation when the between-car time to a car running ahead is smaller than a predetermined value.

Additionally, when a vehicle is running towards a crossing or a freeway exit, it can be judged that a driver is likely to decelerate the car. Thus, the brake operation predicting part may predict execution of a brake operation when a vehicle is running towards a crossing or a freeway exit Additionally, a driver performs a shift-down operation when he intends to decelerate a car. In this case, it can be judged that the driver is likely to perform a brake operation. Thus, the brake operation predicting part may predict execution of a brake operation when a driver performs a shift-down operation.

Similarly, a driver releases a depression of an accelerator pedal at a high speed when he intends to decelerate a vehicle.

Thus, the brake operation predicting part may predict execution of a brake operation when a depression of an accelerator pedal is being released at a speed greater than a predetermined value.

Further, when a driver shifts a shift lever to a neutral position or shifts a select lever to an N range, it can be judged that the driver is likely to intend to stop a vehicle. Thus, the brake operation predicting part may predict execution of a brake operation when the shift lever is in a neutral position or the select lever is in an N range.

Additionally, the negative pressure in an intake passage downstream of a throttle valve changes in accordance with an opening of the throttle valve. Thus, the negative pressure controller may control the negative pressure in the negative pressure chamber of the brake booster by changing the opening of the throttle valve.

Other objects and further features of the present invention will be apparent from the following detailed description when read in conjunction with the accompanying drawings.

DESCRIPTION OF THE PREFERRED EMBODIMENTS

Figure 1:
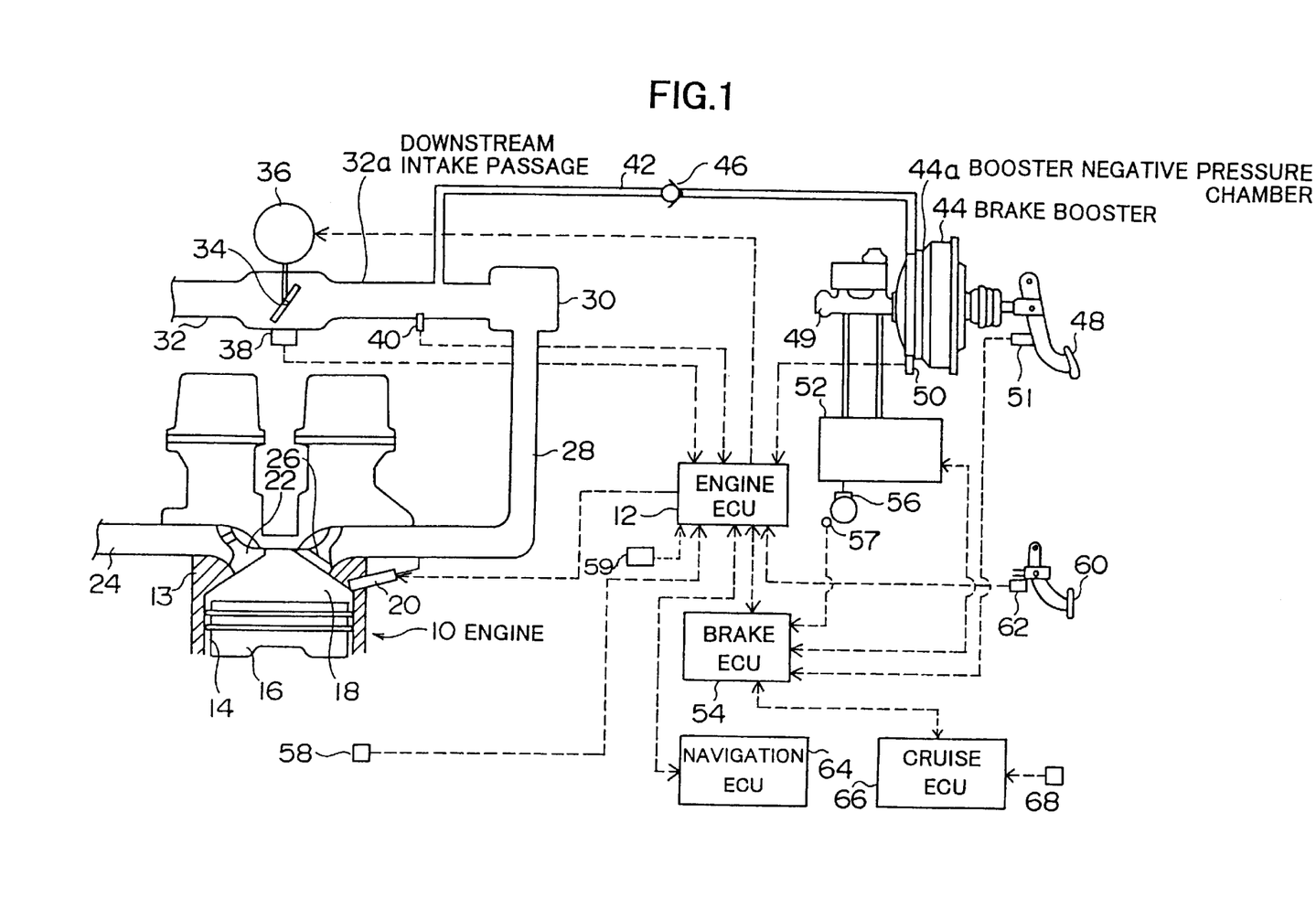
FIG. 1 is a system structure diagram of an embodiment of the present invention.

FIG. 1 shows a system structure diagram of an embodiment according to the present invention. The system of the present embodiment is provided on a vehicle. As shown in FIG. 1, the system includes an engine 10. The engine 10 is controlled by an engine ECU 12. The engine 10 has a cylinder block 13. A cylinder 14 is formed inside the cylinder block 13. The engine 10 has a plurality of cylinders and only one cylinder 14 is shown in FIG. 1.

A piston 16 is disposed in the cylinder 14. The piston 16 can move vertically in the cylinder 14. A combustion chamber 18 is defined inside the cylinder 14 above the piston 16. An injection port of a fuel injector 20 is exposed in the combustion chamber 18. The fuel injector 20 injects fuel in the combustion chamber 18 in response to a control signal supplied by the engine ECU 12. That is, the engine 10 of the present embodiment is a direct-injection engine.

An exhaust pipe 24 is connected to the combustion chamber 18 via an exhaust valve 22. Additionally, an intake manifold 28 is connected to the combustion chamber 18 via an intake valve 26. A surge tank 30 is connected to an upstream side of the intake manifold 28. Further, an intake pipe 32 is connected to an upstream side of the surge tank 30.

A throttle valve 34 is disposed in the intake pipe 32. The throttle valve 34 is connected to a throttle motor 36. The throttle motor 36 is electrically connected to the engine ECU 12. The throttle motor 36 changes an opening of the throttle valve 34 (hereinafter referred to as a throttle opening SC) in response to a control signal supplied by the engine ECU 12. A throttle-opening sensor 38 is disposed near the throttle valve 34. The throttle-opening sensor 38 delivers an electric signal in accordance with the throttle opening SC to the engine ECU 12. The engine ECU 12 detects the throttle opening SC based on the signal delivered by the throttle-opening sensor 38.

An intake-pressure sensor 40 is disposed in the intake pipe 32 at a position downstream of the throttle valve 34. Hereinafter, this part of the intake pipe 32 is referred to as a downstream intake passage 32a. The intake-pressure sensor 40 delivers an electric signal to the engine ECU 12 in accordance with a negative pressure in the downstream intake passage 32a (hereinafter referred to as an intake manifold negative pressure PM). The engine ECU 12 detects the intake manifold negative pressure PM based on the signal delivered by the intake-pressure sensor 40.

One end of a negative pressure supply passage 42 is connected to the downstream intake passage 32a. The other end of the negative pressure supply passage 42 is connected to a negative pressure chamber of a brake booster 44. Hereinafter, the negative pressure chamber of the brake booster 44 is referred to as a booster negative pressure chamber 44a.

A check valve 46 is disposed in the negative pressure supply passage 42. The check valve 46 is a one-way valve which permits a flow of air only in a direction from the booster negative pressure chamber 44a to the downstream intake passage 32a. Thus, when the intake manifold negative pressure PM is larger than a negative pressure in the booster negative pressure chamber 44a (hereinafter referred to as a booster negative pressure PB), the booster negative pressure PB is increased until it is equalized with the intake manifold pressure PM. On the other hand, when the intake manifold negative pressure PM is smaller than the booster negative pressure PB, air is prevented from flowing from the downstream intake passage 32a to the booster negative pressure chamber 44a, and thus the booster negative pressure PB is prevented from being decreased.

It should be noted that, in the present specification, a "negative pressure" is represented by a pressure difference relative to the atmospheric pressure. Thus, an expression that "a negative pressure is large" means that the pressure difference relative to the atmospheric pressure is large, that is, an absolute pressure is low.

The brake booster 44 is connected to a brake pedal 48 and a master cylinder 49. The brake booster 44 assists an operation of the brake pedal 48 by using the booster negative pressure PB as a power source so that a higher fluid pressure is generated in fluid chambers of the master cylinder 49. Hereinafter, the fluid pressure generated in the fluid chambers of the master cylinder 49 is referred to as a master cylinder pressure $P_{M/C}$.

A booster pressure sensor 50 is disposed in the booster negative pressure chamber 44a. The booster pressure sensor 50 delivers an electric signal to the engine ECU 12 in accordance with the booster negative pressure PB. The engine ECU 12 detects the booster negative pressure PB based on the signal delivered by the booster pressure sensor 50.

A brake switch 51 is disposed near the brake pedal 48. The brake switch 51 delivers an ON signal to the brake ECU 54 only when the brake pedal 48 is depressed. The ECU 54 determines whether or not a brake operation is performed based on the signal delivered by the brake switch 51.

A hydraulic actuator 52 is connected to the fluid chambers of the master cylinder 49. The hydraulic actuator 52 is controlled by the brake ECU 54. Wheel cylinders 56 provided to the respective wheels are connected to the hydraulic actuator 52. Wheel speed sensors 57 are disposed near the respective wheels. In FIG. 1, only the wheel cylinder 56 and the wheel speed sensor 57 for one of the wheels are shown. Each of the wheel speed sensors 57 delivers a pulse signal to the brake ECU 54 in accordance with a wheel speed VW. The brake ECU 54 detects the wheel speed VW based on the signals delivered by the wheel speed sensors 57. The brake ECU 54 calculates a wheel acceleration DVW based on a change rate of the wheel speed VW. Further, the brake ECU 54 calculates a vehicle speed V based on the wheel speed VW.

The hydraulic actuator 52 can perform a regular brake control for generating a braking force in accordance with a brake operation and a vehicle behavior control for generating a braking force in accordance with a behavior of a vehicle regardless of the brake operation. In the present embodiment, the regular brake control is achieved by supplying the master cylinder pressure $P_{M/C}$ to the wheel cylinders 56. On the other hand, the vehicle behavior control is achieved by appropriately operating solenoid valves provided to the hydraulic actuator 52 so as to supply a required fluid pressure to each of the wheel cylinders 56. It should be noted that the vehicle behavior control includes a vehicle stability control (VSC) and a traction control (TRC).

The VSC is a control for stabilizing a behavior of a vehicle. The brake ECU 54 starts the VSC when an unstable behavior of the vehicle is detected based on information such as a steering angle, a lateral acceleration of each wheel, a yaw rate, a deceleration, and a slip rate of each wheel. In the VSC, the brake ECU 54 controls the hydraulic actuator 52 to provide an appropriate braking force to each wheel so that the behavior of the vehicle is stabilized.

The TRC is a control for preventing a slip due to an excessive driving torque of a wheel (hereinafter referred to as a driving slip). The brake ECU 54 starts the TRC when a driving slip is detected. In the TRC, the brake ECU 54 controls the hydraulic actuator 52 to provide an appropriate braking force to each wheel so that the driving slip is cancelled.

As shown in FIG. 1, a revolution sensor 58 is provided to the engine 10. The revolution sensor 58 delivers a pulse signal to the engine ECU 12 in accordance with a rotational speed Ne of the engine 10. The engine ECU 12 detects the rotational speed Ne based on the signal delivered by the revolution sensor 58.

A shift-position sensor 59 is electrically connected to the brake ECU 54. The shift-position sensor 59 delivers an electric signal to the brake ECU 54 in accordance with a position of a shift lever (or a select lever, in case of a automatic transmission vehicle) of the vehicle. The brake ECU 54 detects the position of the shift lever (or a range of the select lever) based on the signal delivered by the shift-position sensor 59.

An accelerator-opening sensor 62 is provided near an accelerator pedal 60. The accelerator-opening sensor 62 delivers an electric signal to the engine ECU 12 in accordance with a stroke of the accelerator pedal 60 (hereinafter referred to as an accelerator opening AC). The engine ECU 12 detects the accelerator opening AC based on the signal delivered by the accelerator opening sensor 62.

A navigation ECU 64 is electrically connected to the engine ECU 12. The navigation ECU 64 is a control unit for controlling an automobile navigation system provided on the vehicle. The navigation ECU 64 transmits information regarding a current position of the vehicle to the engine ECU 12.

Additionally, a cruise ECU 66 is electrically connected to the brake ECU 54. The cruise ECU 66 is a control unit for controlling a radar cruise of the vehicle. A radar unit 68 is electrically connected to the cruise ECU 66. The radar unit 68 is a distance sensor such as an ultrasonic sensor or an optical sensor for sensing a distance to a vehicle running ahead. The cruise ECU 66 detects the distance to the vehicle running ahead based on an output signal of the radar unit 68 and transmits information regarding the detected distance to the brake ECU 54.

In the present embodiment, the engine 10 operates in one of a stoichiometric combustion mode and a stratified charge combustion mode in accordance with a load thereof. In the stoichiometric combustion mode, a stoichiometric combustion is achieved in the combustion chamber 18 by changing the throttle opening SC based on the accelerator opening AC so that the volume of air supplied to the combustion chamber 18 is controlled in accordance with the acceleration opening AC. In the stratified charge combustion mode, a stratified charged combustion is achieved in the combustion chamber 18 by fully opening the throttle valve 34 so that a large volume of air is supplied to the combustion chamber 18 and by injecting a quantity of fuel corresponding to the accelerator opening AC during compression strokes of the engine 10.

According to the stratified charged combustion mode, a fuel economy is improved because a larger air-fuel ratio is achieved in the combustion chamber 18 as compared to a case of the stoichiometric combustion mode. Additionally, the fuel economy is further improved in the stratified charge combustion mode because a pumping loss of the engine 10 is reduced by the throttle valve 34 being fully opened. Therefore, from a viewpoint of improving the fuel economy, it is desirable to operate the engine 10 in the stratified charge combustion mode.

However, when a load of the engine 10 (that is, the acceleration opening AC) is increased, a quantity of fuel injected by the fuel injector 20 becomes large. In this case, the stratified charge combustion can no longer be achieved when the injection quantity exceeds a certain value, because a volume of air supplied to the intake pipe 32 (that is, a specific volume of intake air Q) becomes too small as compared to the injection quantity even if the throttle valve 34 is fully opened.

For the above reasons, the engine ECU 12 calculates the injection quantity based on the accelerator opening AC and determines whether or not the stratified charge combustion can be achieved with the calculated injection quantity. When it is determined that the stratified charge combustion can be achieved, the engine ECU 12 achieves the stratified charge combustion mode by fully opening the throttle valve 34 and controlling the injector 20 to inject a quantity of fuel corresponding to the accelerator opening AC during compression strokes of the engine 10. On the other hand, if it is determined that the stratified charge combustion cannot be achieved, the engine ECU 12 achieves the stoichiometric combustion mode by setting the throttle opening SC to be a value corresponding to the accelerator opening AC and controlling the injector 20 to inject a quantity of fuel corresponding to the throttle opening SC during intake strokes of the engine 10.

As mentioned above, in the stratified charge combustion mode, the throttle valve 34 is fully opened regardless of the accelerator opening AC. When the throttle valve 34 is fully opened, the negative pressure generated in the downstream intake passage 32a (that is, the intake manifold negative pressure PM) becomes small. Additionally, the brake booster 44 assists a brake operation by using the booster negative pressure PB as a power source, and thus the booster negative pressure PB is decreased more as the braking force becomes larger. Therefore, in the stratified charge combustion mode, since a sufficient negative pressure cannot be supplied from the downstream intake pipe 32a to the booster negative pressure chamber 44a, the booster negative pressure PB is gradually decreased in association with the brake operation. For this reason, if a brake operation is performed when the engine 10 is operating in the stratified charge combustion mode, it is possible that the brake booster 44 cannot sufficiently assist the brake operation due to the insufficient booster negative pressure PB.

According to the-present embodiment, in order to avoid such a problem, in a situation where no brake operation is performed and a brake operation is expected to be performed, the throttle opening SC is reduced and, if necessary, the operation mode of the engine 10 is switched from the stratified charge combustion mode to the stoichiometric combustion mode, so that a brake booster negative pressure PB required to positively operate the brake booster is obtained.

When the throttle opening is reduced, the intake manifold negative pressure PM is increased. Additionally, when the throttle opening is reduced, it is possible that the stratified charge combustion cannot be maintained-since the specific volume of intake air Q may be decreased so as to be insufficient for the injection quantity. As mentioned above, in the stoichiometric combustion mode, the throttle opening SC is controlled to be a value corresponding to the accelerator opening AC. Thus, when the stratified charge combustion cannot be maintained, the intake manifold negative pressure PM can be increased by switching the operation mode of the engine 10 to the stoichiometric combustion mode, because the throttle opening SC is reduced as long as the accelerator pedal 60 is not fully depressed.

In this way, it is possible to always maintain a sufficient booster negative pressure PB by reducing the throttle opening SC or switching the operation mode of the engine 10 to the stoichiometric combustion mode so that the intake manifold negative pressure PM is increased. Hereinafter, the above control for increasing the intake manifold negative pressure PM is referred to as a booster negative pressure control.

It should be noted that, if the booster negative pressure control is executed while a brake operation is being performed, the brake pedal 48 is pulled into the brake booster 44 due to a rapid increase in the booster negative pressure PB. In this case, an excessive deceleration may be generated. To avoid such a problem, in the present embodiment, the booster negative pressure control is executed only in a situation where no brake operation is performed and a brake operation is expected to be performed.

In the present embodiment, when no brake operation is performed and a brake operation is expected to be performed, the brake ECU 54 transmits a negative-pressure-requiring signal to the engine ECU 12 indicating a value of negative pressure to be supplied to the booster negative pressure chamber 44a (hereinafter referred to as a required-negative-pressure value $P_{req}$). When the engine ECU 12 receives the negative-pressure-requiring signal from the brake ECU 54, it performs the booster negative pressure control so as to generate an intake manifold negative pressure PM equal to the required-negative-pressure value $P_{req}$. Additionally, the engine ECU 12 transmits a signal indicating the booster negative pressure PB and the accelerator opening AC to the brake ECU 54 at appropriate timings. Further, the brake ECU 54 transmits a maximum-negative-pressure-requiring signal to the engine ECU 12 when a failure has occurred in a brake system of the vehicle.

Figure 2:
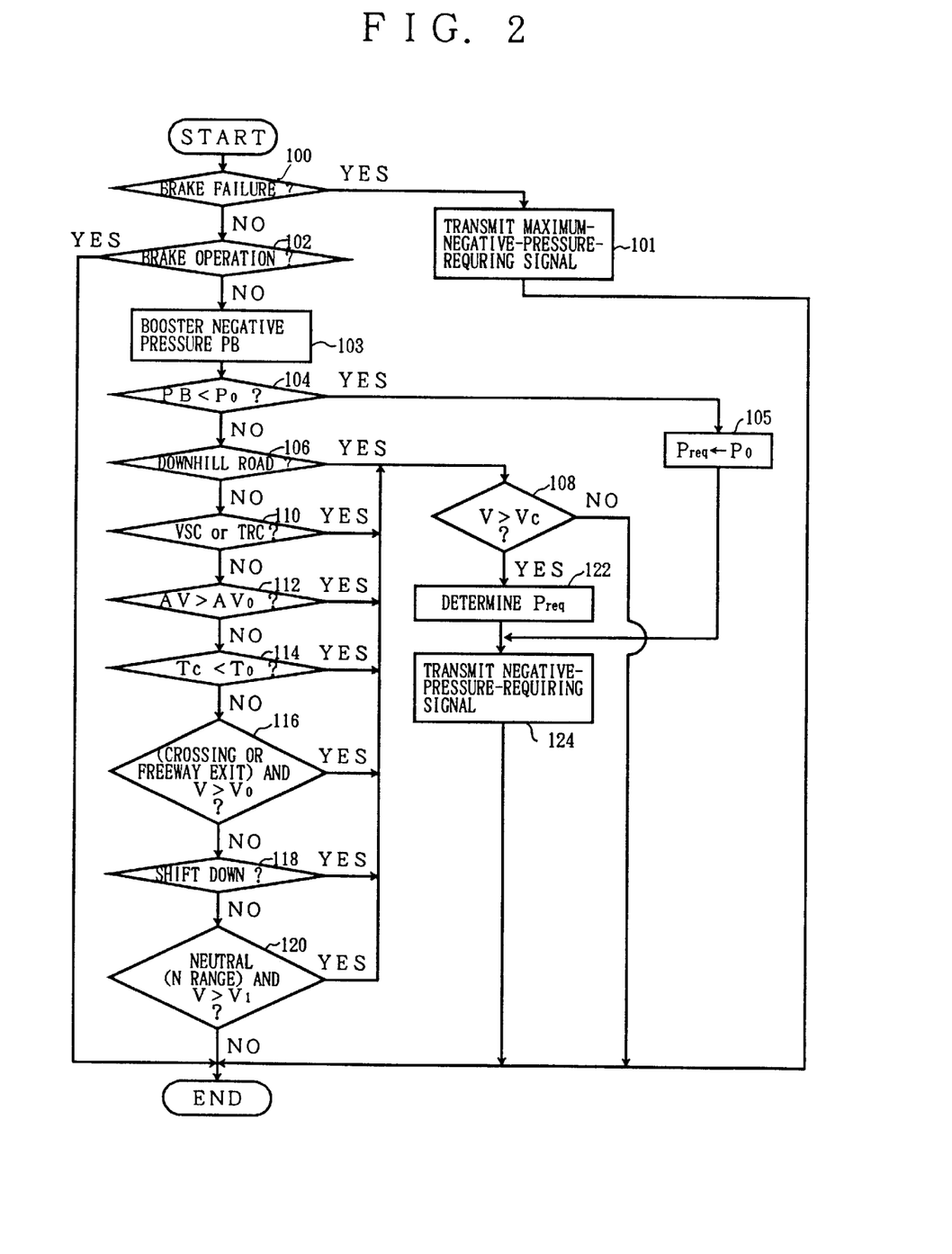
FIG. 2 is a flowchart of an example of a routine performed by a brake ECU in the present embodiment.

Now, a detailed description will be given of the processes performed by the brake ECU 54 and the engine ECU 12 so as to achieve the above-mentioned booster negative pressure control. First, a description will be given of the process performed by the brake ECU 54 with reference to FIG. 2. FIG. 2 is a flowchart of an example of a routine performed by the brake ECU 54 so as to transmit the negative-pressure-requiring signal to the engine ECU 12. The routine shown in FIG. 2 is repeatedly started every time when one process cycle thereof is finished. When the routine shown in FIG. 2 is started, the process of step 100 is performed first.

In step 100, it is determined whether or not a failure has occurred in the brake system. If a failure has occurred in the brake system, it is determined that a booster negative pressure PB as large as possible should be generated. In this case, the maximum-negative-pressure-requiring signal is transmitted to the engine ECU 12 in step 101, and then the present routine is ended. On the other hand, if no failure has occurred in the brake system, then the process of step 102 is performed.

In step 102, it is determined whether or not a brake operation is being performed based on the output signal of the brake switch 51. If a brake operation is being performed, it is determined that the booster negative pressure control should not be performed, and then the present routine is ended. On the other hand, if no brake operation is being performed in step 102, then the process of step 103 is performed.

In step 103, the booster negative pressure PB is detected based on the signal transmitted from the engine ECU 12.

In step 104, it is determined whether or not the booster negative pressure PB is smaller than a predetermined value P0. The predetermined value P0 is a minimum value of the booster negative pressure PB which should always be maintained. Thus, if it is determined that PB is smaller than P0, then in step 105, the required-negative-pressure value $P_{req}$ is set to be the predetermined value P0. On the other hand, if it is determined that PB is not smaller than P0, then in step 106 and subsequent steps, processes are performed for determining whether or not a brake operation is expected to be performed.

In step 106, it is determined whether or not the vehicle is running on a downhill road. When a vehicle is running on a downhill road, a larger acceleration is generated for a constant engine power as compared to a case where the vehicle is running on a flat or uphill road. Thus, the brake ECU 54 uses the accelerator opening AC and the wheel acceleration DVW as values representing the engine power and the vehicle acceleration, respectively, and if the wheel acceleration DVW is larger than a reference value corresponding to the accelerator opening AC, the brake ECU 54 determines that the vehicle is running on a downhill road. When the vehicle is running on a downhill road, it can be judged that the driver is likely to perform a brake operation so as to suppress an increase in the vehicle speed V. Thus, if it is determined that the vehicle is running on a downhill road in step 106, it is judged that a brake operation is expected to be performed, and then the process of step 108 is performed. On the other hand, if it is determined that the vehicle is not running on a downhill road in step 106, then the process of step 110 is performed.

In step 110, it is determined whether or not the VSC or the TRC is being performed. As mentioned above, the VSC is performed when an unstable behavior has occurred in the vehicle. When an unstable behavior has occurred in the vehicle, it can be judged that the driver is likely to perform a brake operation so as to stabilize the behavior of the vehicle. Additionally, the TRC is performed when a driving slip is generated due to an excessive driving torque. Thus, when the TRC is being performed, it can be judged that the VSC is likely to be started due to an unstable behavior of the vehicle caused by the driving slip. Thus, if it is determined that the VSC or the TRC is performed in step 110, it is judged that a brake operation is expected to be performed and then the process of step 108 is performed. On the other hand, if neither the TRC nor the VSC is being performed in step 110, the process of step 112 is performed.

In step 112, it is determined whether or not a decreasing rate AV of the accelerator opening AC is greater than a predetermined value AV0. When a depression of the accelerator pedal 60 is being rapidly released, it can be judged that the driver intends to decelerate the vehicle due to, for example, an occurrence of an obstacle ahead of the vehicle. Thus, if it is determined that AV is greater than AV0, it is judged that a brake operation is expected to be performed and then the process of step 108 is performed. On the other hand, if AV is not greater than AV0 in step 112, then the process of step 114 is performed.

In step 114, it is determined whether or not a between-car time Tc is smaller than a predetermined value T0. The between-car time Tc is a value obtained by dividing a distance to a car running ahead by a relative approaching speed to that car. That is, the between-car time is a time until a contact with the car running ahead occurs when the current relative approaching speed is maintained. When the between-car time Tc becomes small, it can be judged that the driver is likely to perform a brake operation so as to avoid a contact with the car running ahead. Thus, if Tc is smaller than T0 in step 114, it is judged that a brake operation is expected to be performed, and then the process of step 108 is performed. On the other hand, if Tc is not smaller than T0, then the process of step 116 is performed.

In step 116, it is determined whether or not the 20 vehicle is running towards a crossing or a freeway exit and the vehicle speed V is greater than or equal to a predetermined value V0. The determination whether or not the vehicle is running towards a crossing or a freeway exit is performed based on the position information transmitted by the navigation ECU 64. When the vehicle is running towards a crossing or a freeway exit with a speed greater than a certain speed, it can be judged that the driver is likely to perform a brake operation so as to decelerate the vehicle. Thus, if it is affirmatively determined in step 116, it is judged that a brake operation is expected to be performed and then the process of step 108 is performed. On the other hand, if it is negatively determined in step 116, then the process of step 118 is performed.

In step 118, it is determined whether or not a shift-down operation is performed by the driver. Generally, a shift-down operation is performed when a driver intends to decelerate the vehicle. Therefore, when a shift-down operation is performed, it can be judged that the driver is likely to perform a brake operation. Thus, if it is determined that a shift-down operation is performed in step 118, it is judged that a brake operation is expected to be performed and then the process of step 108 is performed. On the other hand, if it is determined that the shift-down operation is not performed in step 118, then the process of step 120 is performed. It should be noted that the shift-down operation in the present invention includes a shift-down operation in an automatic transmission (AT) car (for example, an operation of shifting a select lever from a D3 range to a D2 range) as well as a shift-down operation in a manual transmission (MT) car.

In step 120, it is determined whether or not a shift lever is in a neutral position (or a select lever is in an N range in case of an AT car) and the vehicle speed V is greater than or equal to a predetermined value V1. Generally, when a shift lever is shifted to a neutral position or a select lever is shifted to an N range, it can be judged that the driver is likely to intend to stop the vehicle. Thus, if it is affirmatively determined in step 120, it is judged that a brake operation is expected to be performed and then the process of step 108 is performed. On the other hand, if it is negatively determined in step 120, this means that it is negatively determined in all of steps 106 and 110 to 120. In this case, it is judged that a brake operation is not expected to be performed and the present routine is ended.

In step 108, it is determined whether or not the vehicle speed V is greater than a predetermined value Vc. The predetermined value Vc is a maximum value of such a vehicle speed V that, once the booster negative pressure PB equal to the minimum value P0 is generated, the brake booster 44 can continue to assist a brake operation until the vehicle stops, in a situation where the throttle opening SC is not further decreased. Thus, when V is not greater than Vc, it is determined that the booster negative pressure control need not be performed and the present routine is ended. On the other hand, if V is greater than Vc in step 108, then the process of step 122 is performed.

In step 122, the required-negative-pressure value $P_{req}$ is set. The required-negative-pressure value $P_{req}$ is set to be a minimum value of the booster negative pressure PB which is sufficient for the brake booster 44 to assist a brake operation until the vehicle stops in a situation where no negative pressure is supplied to the booster negative pressure chamber 44a.

Figure 3:
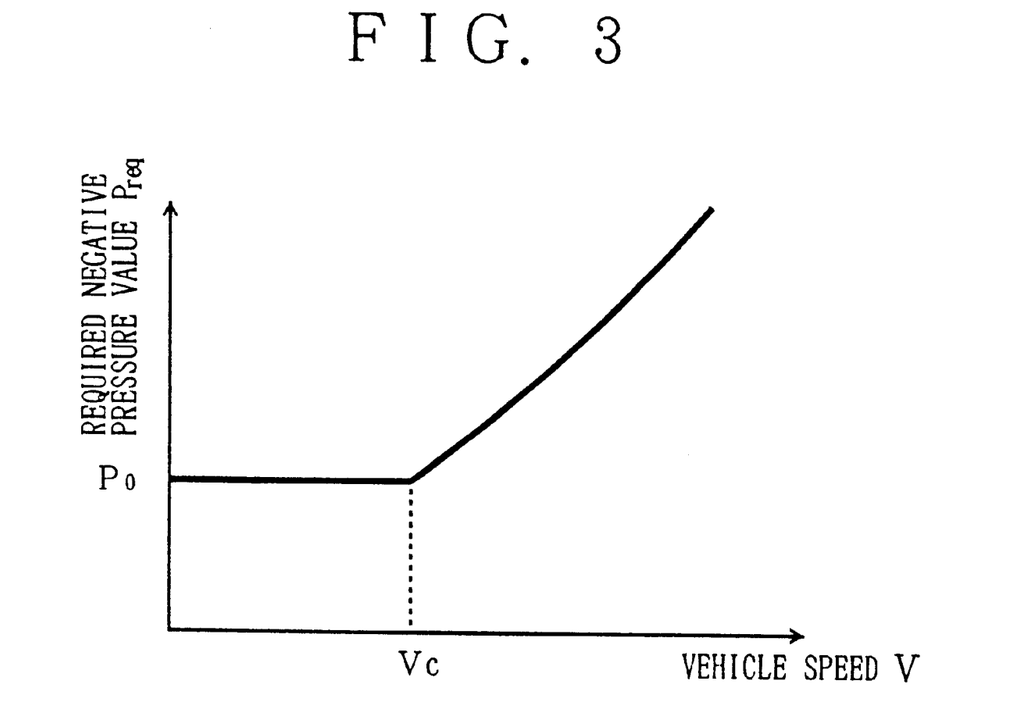
FIG. 3 is an example of a map referred to by the brake ECU so as to determine a required-negative-pressure value.

FIG.3 shows an example of a map which is referred to by the brake ECU 54 so as to set the required-negative-pressure value $P_{req}$ based on the vehicle speed V in step 122.

As mentioned above, the booster negative pressure PB is consumed as a braking force increases. Additionally, a braking force, which is generated at a time when the vehicle is to stop, becomes larger as the vehicle speed V becomes higher. Thus, as the vehicle speed becomes higher, the booster negative pressure PB is consumed to a greater extent until the vehicle stops. In other words, as the vehicle speed becomes higher, a value of the booster negative pressure PB is increased, which value should be maintained so as to operate the brake booster 44 to assist a brake operation until the vehicle stops without supplying any negative pressure to the booster negative pressure chamber 44a. For this reason, as shown by a curve in FIG.3, when the vehicle speed V is smaller than or equal to a predetermined value Vc, the required-negative-pressure value $P_{req}$ is set to be equal to the reference value P0, and when the vehicle speed V exceeds the predetermined value Vc, the required-negative-pressure value $P_{req}$ is set to be a greater value as the vehicle speed V increases.

After the required-negative-pressure value $P_{req}$ is set in step 122 or 105, the negative-pressure-requiring signal indicating the required-negative-pressure value $P_{req}$ is transmitted to the engine ECU 12 in step 124. When the process of step 124 is finished, the present routine is ended.

Figure 4:
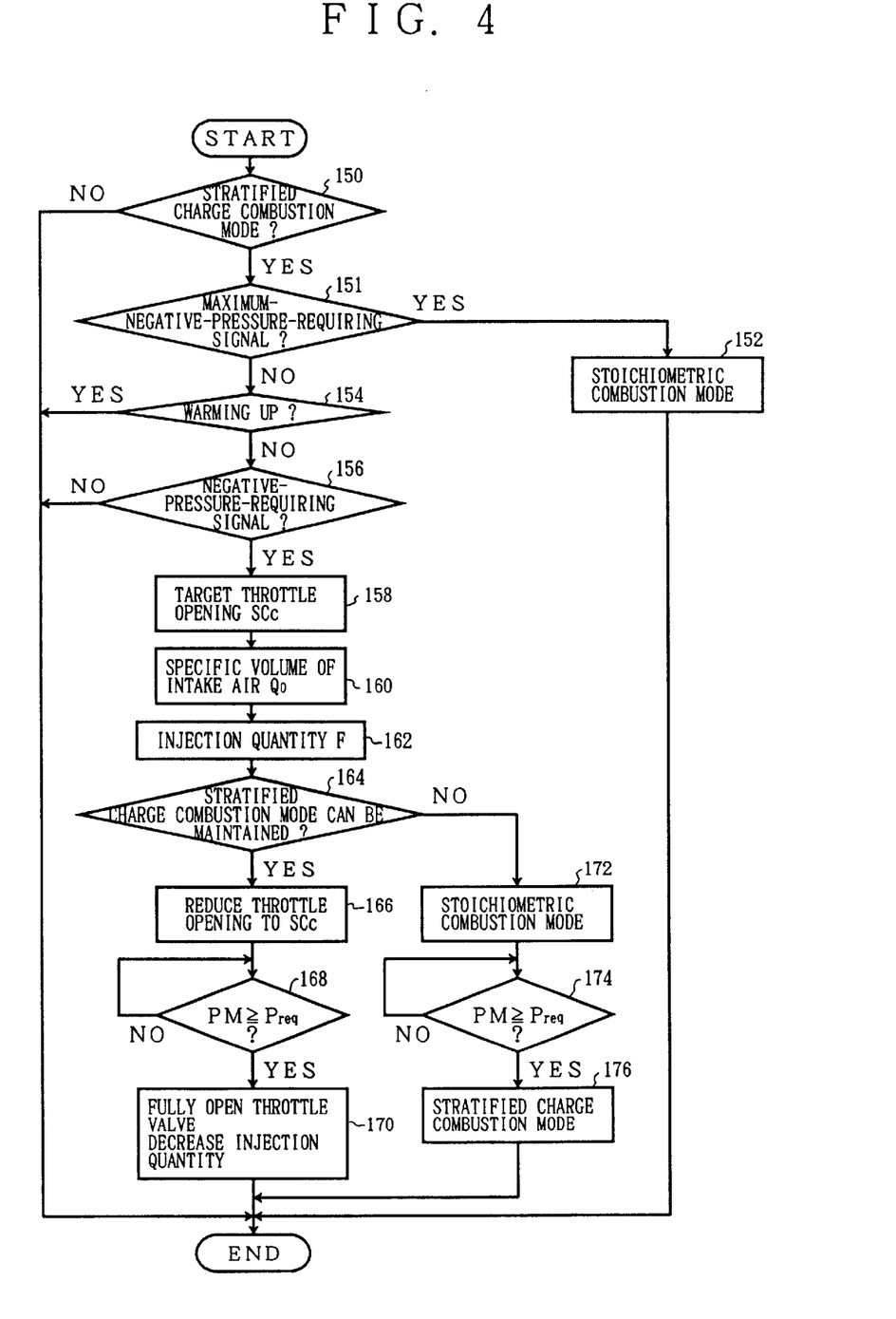
FIG. 4 is a flowchart of an example of a routine performed by an engine ECU in the present embodiment.

Now, a description will be given of a process performed by the engine ECU 12 in the present embodiment. FIG. 4 shows a flowchart of an example of a routine performed by the engine ECU 12 so as to achieve the booster negative pressure control in the present embodiment. The routine shown in FIG. 4 is repeatedly started every time when one cycle process thereof is finished. When the routine shown in FIG. 4 is started, the process of step 150 is performed first.

In step 150, it is determined whether or not the engine 10 is operating in the stratified charge combustion mode. If it is negatively determined, that is, if the engine 10 is operating in the stoichiometric combustion mode, it is judged that the booster negative pressure control cannot be performed without decreasing the power of the engine 10. In this case, no further process is performed thereafter and the present routine is ended. On the other hand, if the engine 10 is operating in the stratified charge combustion mode in step 150, then the process of step 151 is performed.

In step 151, it is determined whether or not the maximum-negative-pressure-requiring signal is transmitted by the brake ECU 54. If the maximum-negative-pressure-requiring signal is transmitted, then the operation mode of the engine 10 is switched to the stoichiometric combustion mode in step 152. As mentioned above, when the operation mode of the engine 10 is switched to the stoichiometric combustion mode, the throttle opening SC is reduced and a larger intake manifold negative pressure PM is generated. When the process of step 152 is finished, the present routine is ended. On the other hand, if the maximum-negative-pressure-requiring signal is not transmitted in step 151, then the process of step 154 is performed.

In step 154, it is determined whether or not the engine 10 is being warmed up. As mentioned above, the throttle opening SC is reduced when the booster negative pressure control is performed. Thus, if the booster negative pressure control is performed during the warm-up of the engine 10, the engine 10 cannot be adequately warmed up. Thus, if the engine 10 is being warmed up in step 154, the engine ECU 54 determines that the booster negative pressure control should not be performed and ends the present routine, giving priority to the warm-up of the engine 10. On the other hand, if the engine 10 is not being warmed up in step 154, then the process of step 156 is performed.

In step 156, it is determined whether or not the negative-pressure-requiring signal is being transmitted from the brake ECU 54. If the negative-pressure-requiring signal is not being transmitted, then the present routine is ended. On the other hand, if the negative-pressure-requiring signal is being transmitted in step 156, then the process of step 158 is performed.

In step 158, a value of the throttle opening SC for generating an intake manifold negative pressure PM equal to the required-negative-pressure value $P_{req}$ (hereinafter, this value of the throttle opening SC is referred to as a target throttle opening SCc) is determined. The intake manifold negative pressure PM increases as the specific volume of intake air Q becomes smaller and the rotational speed Ne becomes greater. Additionally, the specific volume of intake air Q is substantially proportional to the throttle opening SC. Thus, in step 158, the target throttle opening SCc is determined based on the rotational speed Ne and the required-negative-pressure value $P_{req}$. When the process of step 158 is finished, then the process of step 160 is performed.

In step 160, a value Q0 of the specific volume of intake air Q corresponding to the target throttle opening SCc is calculated. In the subsequent step 162, a value F of the injection quantity corresponding to the accelerator opening AC in the stratified charge combustion mode (that is, a value of the injection quantity which is necessary to achieve the engine power required by a driver) is calculated. It should be noted that an injection quantity necessary to achieve a constant engine power increases when the throttle opening SC is decreased to the target throttle opening SCc due to an increase in the pumping loss. In step 162, such an influence of the increase in the pumping loss is taken into consideration in calculating the injection quantity F. When the process of step 162 is finished, then the process of step 164 is performed.

In step 164, it is determined whether or not the stratified charge combustion mode can be maintained with the specific volume of intake air Q0 and the injection quantity F while maintaining the current rotational speed Ne. If it is determined that the stratified charge combustion can be maintained, then in step 166, the throttle opening SC is decreased to the target throttle opening SCc. After the process of step 166 is performed, the intake manifold negative pressure PM starts being increased toward the required-negative-pressure value $P_{req}$. In the subsequent step 168, it is determined whether or not the intake manifold negative pressure PM has reached the required-negative-pressure value $P_{req}$. If it is negatively determined in step 168, then the process of step 168 is performed again. On the other hand, if it is affirmatively determined in step 168, then the process of step 170 is performed.

In step 170, the throttle valve 34 is fully opened again and the injection quantity is decreased by a value corresponding to a decrease in the pumping loss due to the increase in the throttle opening SC. When the process of step 170 is finished, then the present routine is ended.

On the other hand, if, in step 164, it is determined that the stratified charge combustion mode cannot be maintained, then the operation mode of the engine 10 is switched to the stoichiometric combustion mode in step 172. In the stoichiometric combustion mode, a larger intake manifold negative pressure PM is generated as compared to a case of the stratified charge combustion mode because the throttle opening SC is decreased to a value corresponding to the accelerator opening AC. Therefore, after the process of step 172 is performed, the intake manifold negative pressure PM starts being increased.

In the subsequent step 174, it is determined whether or not the intake manifold negative pressure PM has reached the required-negative-pressure value $P_{req}$. If it is negatively determined in step 174, then the process of step 174 is performed again. On the other hand, if it is affirmatively determined in step 174, then the process of step 176 is performed.

In step 176, the operation mode of the engine 10 is returned to the stratified charge combustion mode. When the process of step 176 is finished, the present routine is ended.

According to the routine shown in FIG. 4, an intake manifold negative pressure equal to the required-negative-pressure value $P_{req}$ can be generated. As mentioned above, the required-negative-pressure value $P_{req}$ is set to be a minimum value of the booster negative pressure PB which can positively operate the brake booster 44 until the vehicle stops in a situation where no negative pressure is supplied to the booster negative pressure chamber 44a from the downstream intake passage 32a. Thus, once the intake manifold negative pressure PM equal to the required-negative-pressure value $P_{req}$ is generated and this negative pressure is supplied to the booster negative pressure chamber 44a, the brake booster 44 can positively assist a brake operation until the vehicle stops.

In this way, when a brake operation is expected to be performed, it is possible to obtain a booster negative pressure PB which is required to operate the brake booster 44 until the vehicle stops. Thus, according the present embodiment, it is possible to generate a sufficient braking force until the vehicle stops in the system including the engine 10 constructed as a direct-injection engine.

It should be noted that the negative pressure supply passage 46 may be connected to the surge tank 30 or the intake manifold 28 instead of the downstream intake passage 32*a*.

Further, the present invention is not limited to the embodiment, but variations and modifications may be made without departing from the scope of the present invention.

The present application is based on Japanese priority application No. 10-153253 filed on Jun. 2, 1998, the entire contents of which are hereby incorporated by reference.

What is claimed is:

1. A negative pressure control apparatus for a brake booster in a vehicle for controlling negative pressure in a negative pressure chamber of the brake booster connected to an intake pipe of a direct-injection engine at a position downstream of a valve in the intake pipe, comprising:

a brake operation predicting part for predicting execution of a brake operation by a driver; and a booster negative pressure controller for controlling the negative pressure in said negative pressure chamber to be a required value when execution of a brake operation is predicted under a condition in which the negative pressure is smaller than a predetermined value.

2. The negative pressure control apparatus for a brake booster as claimed in claim 1, wherein said brake operation predicting part predicts execution of a brake operation when the vehicle is running on a downhill road.

3. The negative pressure control apparatus for a brake booster as claimed in claim 1, wherein said brake operation predicting part predicts execution of a brake operation when the vehicle behavior control is being performed.

4. The negative pressure control apparatus for a brake booster as claimed in claim 1, wherein said brake operation predicting part predicts execution of a brake operation when a between-car time to another vehicle running ahead is smaller than a predetermined value.

5. The negative pressure control apparatus for a brake booster as claimed in claim 1, wherein said brake operation predicting part predicts execution of a brake operation when position information is transmitted indicating that the vehicle is running towards a crossing or a free way exit.

6. The negative pressure control apparatus for a brake booster as claimed in claim 1, wherein said brake operation predicting part predicts execution of a brake operation when a shift-down operation is performed by the driver.

7. The negative pressure control apparatus for a brake booster as claimed in claim 1, wherein said brake operation predicting part predicts execution of a brake operation when a depression of an accelerator pedal is being released faster than a predetermined value.

8. The negative pressure control apparatus for a brake booster as claimed in claim 1, wherein said brake operation predicting part predicts execution of a brake operation when a shift lever is in a neutral position or a select lever is in an N range.

9. The negative pressure control apparatus for a brake booster as claimed in claim 1, wherein said negative pressure controller controls the negative pressure by changing an opening of said valve.

10. The negative pressure control apparatus for a brake booster as claimed in claim 9, further comprising:

a mode determining part for, when said negative pressure controller changes the opening of the valve while the engine is operating in a stratified charge combustion mode, determining whether or not the stratified charge combustion mode can be maintained; and a mode switching part for switching the operation mode of the engine to a stoichiometric combustion mode when said mode determining part determines that the stratified charge combustion mode cannot be maintained.

11. The negative pressure control apparatus for a brake booster as claimed in claim 1, wherein said required value is determined based on the vehicle speed.

* * * * *